United States Patent Office.

ADOLPHUS BAEYER, OF MUNICH, BAVARIA, GERMANY, ASSIGNOR TO THE BADISCHE ANILIN AND SODA FABRIK, OF MANNHEIM, BADEN, GERMANY.

MANUFACTURE OF ARTIFICIAL INDIGO.

SPECIFICATION forming part of Letters Patent No. 240,361, dated April 19, 1881.

Application filed February 15, 1881. (Specimens.)

*To all whom it may concern:*

Be it known that I, ADOLPHUS BAEYER, a subject of the King of Bavaria, residing at Munich, in the Kingdom of Bavaria and Empire of Germany, have invented new and useful Improvements in the Manufacture of Coloring-Matters or Dye-Stuffs, of which the following is a specification.

This invention consists in the discovery that improved dye-stuffs or coloring-matters may be obtained from the dye-stuff artificial indigo described in Letters Patent No. 235,193, and dated December 7, 1880.

In carrying out my invention I take the above-named artificial indigo and exhaust the same by repeated treatment with a cold and aqueous solution of sulphurous acid; instead of uncombined sulphurous acid, I may also employ bisulphite of soda. The extract thus obtained is filtered and the clear solution is precipitated by a suitable saline precipitant, such as common salt, (chloride of sodium,) whereby a blue precipitate is obtained, which, after filtering, may be used for dyeing and printing in a manner similar to carmine of indigo.

The new dye-stuff is soluble in water; its aqueous solution, on being boiled with dilute muriatic acid, is decomposed under evolution of sulphurous acid with the simultaneous production of the dye-stuff claimed and described in Letters Patent No. 235,488, dated December 14, 1880.

What I claim as new, and desire to secure by Letters Patent, is—

1. As a new article of manufacture, the blue dye-stuff or coloring-matter having the properties hereinbefore described.

2. The within-described process for producing a dye-stuff or coloring-matter by treatment of the artificial indigo described in Patent No. 235,193 with sulphurous acid and subsequent precipitation with common salt, (chloride of sodium,) substantially as herein set forth.

In testimony whereof I have hereunto set my hand in the presence of two subscribing witnesses.

ADOLPHUS BAEYER.

Witnesses:
 PAUL FRIEDLAENDER,
 WILHELM HAUSSMANN.